US011896860B2

(12) United States Patent
Hiltemann et al.

(10) Patent No.: US 11,896,860 B2
(45) Date of Patent: Feb. 13, 2024

(54) FIRE FIGHTING SYSTEM, RAIL VEHICLE WITH FIRE FIGHTING SYSTEM AND METHOD FOR OPERATING A FIRE FIGHTING SYSTEM

(71) Applicant: FOGTEC Brandschutz GmbH, Cologne (DE)

(72) Inventors: Ulrich Hiltemann, Wermelskirchen (DE); Martin Frießner, Dormagen (DE); Roger-André Dirksmeier, Menden (DE)

(73) Assignee: FOGTEC Brandschutz GmbH, Cologne (DE)

( * ) Notice: Subject to any disclaimer, the term of this patent is extended or adjusted under 35 U.S.C. 154(b) by 0 days.

(21) Appl. No.: 17/635,604

(22) PCT Filed: Sep. 4, 2020

(86) PCT No.: PCT/EP2020/074790
§ 371 (c)(1),
(2) Date: Feb. 15, 2022

(87) PCT Pub. No.: WO2021/043997
PCT Pub. Date: Mar. 11, 2021

(65) Prior Publication Data

US 2022/0305309 A1 Sep. 29, 2022

(30) Foreign Application Priority Data

Sep. 5, 2019 (DE) ..................... 10 2019 123 788.2

(51) Int. Cl.
*A62C 3/07* (2006.01)
*A62C 35/02* (2006.01)

(52) U.S. Cl.
CPC ............. *A62C 3/07* (2013.01); *A62C 35/023* (2013.01)

(58) Field of Classification Search
CPC ....... A62C 35/13; A62C 35/68; A62C 35/023; A62C 13/70; A62C 99/0018; A62C 3/07; A62C 35/02
See application file for complete search history.

(56) References Cited

U.S. PATENT DOCUMENTS 7,143,775 B2 * 12/2006 Sundholm ........... F16K 17/1626 137/68.13
9,814,916 B2 * 11/2017 Chattaway ........... A62C 35/645
(Continued)

FOREIGN PATENT DOCUMENTS

CN 106075768 A 11/2016
CN 109200503 A 1/2019
(Continued)

OTHER PUBLICATIONS

Korean Intellectual Property Office, Office Action, Application No. 10-2022-7007796, dated Dec. 6, 2022, 7 pages.
(Continued)

*Primary Examiner* — Christopher R Dandridge
(74) *Attorney, Agent, or Firm* — Sunstein LLP

(57) ABSTRACT

Fire fighting system with a first feed platform arranged for feeding a pipe system having extinguishing nozzles with extinguishing fluid comprising a first sub-system with a first extinguishing fluid reservoir, at least two first propellant gas reservoirs, and a first control circuit, wherein the first propellant gas reservoirs each have a valve for pneumatically coupling the respective first propellant gas reservoir to the extinguishing fluid reservoir and the respective valves can be pneumatically activated in each case via an outlet of the respective other valve, a second sub-system having a second extinguishing fluid reservoir, at least two second propellant gas reservoirs and a second control circuit, the second propellant gas reservoirs each having a valve for pneumatically coupling the respective second propellant gas reservoir to the extinguishing fluid reservoir, and the respective valves being activatable pneumatically in each case via
(Continued)

an outlet of the respective other valve, characterized in that the first control circuit is operatively connected to a first one of the valves of the first subsystem and to a second one of the valves of the second subsystem, and in that the second control circuit is operatively connected to a second one of the valves of the first subsystem and to a first one of the valves of the second subsystem.

22 Claims, 4 Drawing Sheets

(56) References Cited

U.S. PATENT DOCUMENTS

| | | | |
|---|---|---|---|
| 2006/0038029 | A1 | 2/2006 | Rummig et al. |
| 2012/0037383 | A1 | 2/2012 | Dirksmeier et al. |
| 2018/0250538 | A1 | 9/2018 | Dirksmeier et al. |

FOREIGN PATENT DOCUMENTS

| | | | | | |
|---|---|---|---|---|---|
| DE | 10 2005 018 235 | A1 | 10/2006 | | |
| DE | WO2018137871 | * | 2/2018 | ............. | A62C 27/00 |
| EP | 1419804 | A | 5/2004 | | |
| EP | 1611925 | A1 | 1/2006 | | |
| ES | 1419804 | * | 5/2004 | ............... | A62C 3/07 |
| JP | 2004008566 | A | 1/2004 | | |
| JP | 2009542386 | A | 12/2009 | | |
| JP | 2015054147 | A | 3/2015 | | |
| JP | 2020506108 | A | 2/2020 | | |
| KR | 10-2017-0135236 | | 12/2017 | | |
| WO | 2014/047574 | A2 | 3/2014 | | |
| WO | 2015033424 | A1 | 3/2015 | | |

OTHER PUBLICATIONS

Japan Patent Office, Notification of Reason(s) for Refusal, Application No. 2022-514709, dated Sep. 9, 2022, 9 pages.

International Searching Authority/European Patent Office, International Search Report and Written Opinion of the International Searching Authority, Application No. PCT/EP2020/074790, dated Jan. 19, 2021, with English translation of the International Search Report, 15 pages.

German Patent Office, Office Action, Application No. 10 2019 123 788.2, dated Mar. 18, 2020, 5 pages, in German.

* cited by examiner

FIRE FIGHTING SYSTEM, RAIL VEHICLE WITH FIRE FIGHTING SYSTEM AND METHOD FOR OPERATING A FIRE FIGHTING SYSTEM

CROSS-REFERENCE TO RELATED APPLICATIONS

This application is the national phase entry of international patent application no. PCT/EP2020/074790 filed Sep. 4, 2020 and claims the benefit of German patent application No. 10 2019 123 788.2, filed Sep. 5, 2019, the disclosures of which are incorporated herein by reference in their entirety.

TECHNICAL FIELD

The subject matter relates to a fire fighting system, a rail vehicle with a fire fighting system and a method for operating a fire fighting system.

BACKGROUND ART

Fire fighting systems, especially in public and semi-public areas are subject to the highest safety and quality requirements. In the event of activation of a fire fighting system, i.e. when a fire has been detected by a fire detector and/or fire fighting has been triggered by a fire alarm control panel, it must be ensured that the fire is actually fought at the desired location.

Fire fighting systems (fire suppression systems) must be ready for activation over a long period of time, sometimes several months or years, without maintenance. In addition, in the event of activation, it must be ensured and possible to monitor that activation has actually taken place. This is of particular interest because the fire alarm control panel that triggers the fire alarm and/or a person who triggers the fire alarm may be physically far away from the location of the fire fighting and the fire fighting system and cannot immediately determine whether a triggering has occurred.

For the above-mentioned reasons, the subject matter was based on the object of providing a fire-fighting system that ensures reliable triggering in the event of activation.

An activation state is such a state in which an activation signal from a fire detector, a control center, a fire alarm center or the like has issued a signal, preferably electrical signal, whereupon a fire is to be fought. Opposite to this is the idle state. The idle state is such a state, in which the fire fighting system is ready for operation, but not activated.

So-called cylinder systems for fire fighting systems are well known in the art. They are formed of at least one extinguishing fluid reservoir and at least one propellant gas reservoir connected thereto.

An extinguishing fluid, which is preferably water or water with additives, is usually stored in the extinguishing fluid reservoir without pressure or at very low pressure. A propellant gas reservoir is connected to the extinguishing fluid reservoir via a valve. A propellant gas reservoir stores the propellant gas, in particular nitrogen or CO2, at high pressures, for example between 50 bar and 250 bar. When not in use, the propellant gas reservoir and the extinguishing fluid reservoir are filled and connected to each other via a closed valve.

In the activated state, the valve is opened so that the propellant gas can flow from the propellant gas reservoir into the extinguishing fluid reservoir and expel the extinguishing fluid stored there via a pipeline. For this purpose, a riser pipe is usually arranged in the extinguishing fluid reservoir, to which a pipeline of a pipeline system is connected outside the extinguishing fluid reservoir. Via the piping system, the extinguishing fluid, driven by the propellant gas, can be transported to extinguishing nozzles of the fire fighting system.

The piping system can have a main line and area lines branching off from it. The main line is connected to the extinguishing fluid reservoir. The area lines are connected to the main line via area valves. The extinguishing fluid flowing into the main line can be directed to specific areas via the area valves, depending on the valve position of the area valves. This enables targeted localized firefighting.

SUMMARY OF THE INVENTION

In the present fire fighting system, two subsystems are interconnected.

A first subsystem comprises at least one first extinguishing fluid reservoir, at least two first propellant gas reservoirs and at least one first control circuit. The first control circuit can be used to activate the propellant gas reservoirs and/or to open the valves of the subsystem electrically and/or pneumatically. Activating can be understood hereinafter as allowing propellant gas to escape from the propellant gas reservoir. Activating can be understood hereinafter as opening a valve and/or propellant gas reservoir or activating an activation circuit.

According to an embodiment, the fire fighting system comprises a first sub-system with a first extinguishing fluid reservoir, at least two first propellant gas reservoirs, and a first control circuit, wherein the first propellant gas reservoirs each comprise a valve for pneumatically coupling the respective first propellant gas reservoir with the extinguishing fluid reservoir and the respective valves can each be pneumatically activated via an outlet of the respective other valve, a second sub-system with a second extinguishing fluid reservoir, at least two second propellant gas reservoirs, and a second control circuit, wherein the second propellant gas reservoirs each have a valve for pneumatically coupling the respective second propellant gas reservoir to the extinguishing fluid reservoir and the respective valves can each be pneumatically activated via an outlet of the respective other valve, characterized in that the first control circuit is operatively connected to a first one of the valves of the first sub-system and to a second one of the valves of the second sub-system, and in that the second control circuit is operatively connected to a second one of the valves of the first sub-system and to a first one of the valves of the second sub-system.

The first control circuit can be used to monitor pressures, levels, and/or temperatures of the propellant gas reservoirs of the subsystem. Two first propellant gas reservoirs are provided in the first subsystem. A valve is provided on at least one of the propellant gas reservoirs. Preferably, a valve is provided at each of the first propellant gas reservoirs. The first propellant gas reservoirs are coupled to the first extinguishing fluid reservoir via the valves. The valve has a pneumatic input and a pneumatic outlet. The pneumatic input is connected to one of the first propellant gas reservoirs, and the pneumatic outlet is connected to the first extinguishing fluid reservoir. In order to be able to activate this subsystem safely, it is proposed that the first propellant gas reservoirs are pneumatically cross-coupled to each other.

For this purpose, the valve has a pneumatic actuating input. The pneumatic actuating input is set up in such a way that when the gas pressure applied is above a threshold value corresponding, for example, to at least twice the atmospheric pressure, the valve opens and connects the pneumatic input to the pneumatic outlet.

The crosswise coupling of the propellant gas reservoirs takes place in such a way that a pneumatic actuating input of a valve is coupled to a pneumatic outlet in particular the valve of the respective other propellant gas reservoir. Thus, the gas pressure of the propellant gas applied to the pneumatic outlet of this propellant gas reservoir can be used to activate the other valve when the valve is opened or the propellant gas reservoir is activated. If one of the valves opens or one of the propellant gas reservoirs is activated, an increased pressure due to the propellant gas is present at its pneumatic outlet. Due to the cross-coupling, this increased pressure is not only present in the extinguishing fluid reservoir but also at the actuating input of the other valve. If there is an increased pressure at the actuating input of a valve, the valve is activated and opens.

In the present fire fighting system, a second subsystem is provided in addition to the first subsystem. The second subsystem is similar or identical in structure to the first subsystem. The second subsystem includes at least one second extinguishing fluid reservoir, at least two second propellant gas reservoirs, and at least one second control circuit. The second control circuit can be used to open the valves of the subsystem electrically and/or pneumatically. The second control circuit can be used to monitor pressures, levels and/or temperatures of the subsystem. Two second propellant gas reservoirs are provided in the second subsystem. A valve is provided on at least one of the second propellant gas reservoirs. Preferably, a valve is provided at each of the second propellant gas reservoirs. The second propellant gas reservoirs are coupled to the second extinguishing fluid reservoir via the valves. The valve has a pneumatic input and a pneumatic outlet. The pneumatic input is connected to one of the second propellant gas reservoirs, and the pneumatic outlet is connected to the second extinguishing fluid reservoir. In order to safely activate this subsystem, it is proposed that the second propellant gas reservoirs are cross pneumatically coupled to each other.

Thus, the present fire fighting system has two subsystems with separately operated extinguishing fluid reservoirs, each of which can be redundantly activated via at least two propellant gas reservoirs, respectively. It should be mentioned that the subsystems are preferably identical in design to each other, so that descriptions of one subsystem can be transferred in each case to the other subsystem where indicated.

To increase the triggering reliability, it is now proposed that the control circuits are also cross-connected. This means that the first control circuit is in operative connection with a first of the valves or activation circuits of the first subsystem and a second of the valves or activation circuits of the second subsystem, and that the second control circuit is in operative connection with a second of the valves or activation circuits of the first subsystem and a first of the valves or activation circuits of the second subsystem. Thus, the first control circuit can be used to open the first valve of the first subsystem and/or the second valve or activation circuit of the second subsystem. Via the second control circuit, the second valve or activation circuit of the first subsystem and/or the first valve of the second subsystem can be opened. Preferably, a control circuit optionally activates only one valve or activation circuit in one of the subsystems and not the valves or activation circuits of the two subsystems. Thus, the first or the second sub-system can optionally be activated by both control systems. Activating is understood to mean in particular opening the valve or activating the activation circuit (e.g. igniting the ignition charge). In particular, an activating may include opening a valve and/or expelling the extinguishing fluid into the pipeline.

In the activating state, an activating of the first subsystem may optionally be performed by the first control circuit opening the first valve of the first subsystem and the second control circuit activating the second valve or activation circuit of the first subsystem.

This means that the two propellant gas reservoirs of the first subsystem are activated, in particular electrically activated, by control circuits that are independent of each other. If one of these two electrical activations fails, the crosswise pneumatic interconnection of the propellant gas reservoirs of the first subsystem causes the activation of the electrically non-activated propellant gas reservoir to take place pneumatically.

In the activation state, activation of the second subsystem can also optionally take place by the first control circuit activating the second valve or activation circuit of the second subsystem and the second control circuit opening the first valve of the second subsystem. This means that the two propellant gas reservoirs of the second subsystem are activated, in particular electrically activated, by independent control circuits. If one of these two electrical activations fails, the crosswise pneumatic interconnection of the propellant gas reservoirs of the second subsystem causes the activation of the electrically non-activated propellant gas reservoir to take place pneumatically.

This means that the fire fighting system can be used to selectively activate one of the two subsystems with a particularly high degree of fail-safety. This can be of particular interest as one of the subsystems can be defective and then the other subsystem can be activated via the two control circuits. A defect may either have been detected prior to an activation event and the activation of the respective other subsystem takes place immediately, or a defect may be detected during the activation event, resulting in the control circuits being able to activate the other, previously non-activated subsystem immediately following the activation of the defective subsystem. This will be explained in more detail below.

A particular advantage of the two feed platforms is that they can both be used to fight fires. The amount of extinguishing fluid to be stocked in each of the extinguishing fluid containers of the two feed platforms is less than with only one feed platform. This results in shorter filling times for the extinguishing fluid containers and thus less downtime. Since the individual extinguishing fluid containers have a smaller volume compared to an extinguishing fluid container when using only one feed platform, this also results in smaller installation spaces.

When activated, the propellant gas propels the extinguishing fluid from the extinguishing fluid reservoir into the main line. A check valve can be located between the extinguishing fluid reservoir of each sub-system and the main line. The check valve prevents that if a sub-system is triggered and extinguishing fluid escapes from the extinguishing fluid reservoir, that this extinguishing fluid enters the sub-system that has not been triggered.

If the control of valves is described below, this can also apply mutatis mutandis to the control of activation circuits. A valve can be replaced by an activation circuit, so that in each sub-system either one propellant gas reservoir is provided with a valve and an activation circuit or that in each sub-system each propellant gas reservoir is provided with one valve.

The valves are preferably electric control valves, in particular solenoid valves. The valves are preferably electrically connected to the control circuits. A valve may be activated by an electrical control pulse. Such an electrical control pulse may be, for example, a 12V, 24V, 48V or the like pulse. In particular, activation may occur on a rising edge of a signal from a control circuit.

A valve may have a pneumatic input and a pneumatic outlet. The pneumatic input may be directly connected to the outlet of the propellant gas reservoir, and a pneumatic outlet may be connected to the extinguishing fluid reservoir. In addition, a valve may have an electrical control input as well as a pneumatic actuating input. The electrical control input may be connected to one of the control circuits. The pneumatic actuating input may be connected to a pneumatic outlet of a respective other valve, as described above. The valve is activated (i.e., the valve is opened) via the electrical and/or pneumatic actuating input.

The propellant gas reservoirs of a sub-system may be identical or different to each other. For example, a first propellant gas reservoir may be formed for expelling the extinguishing fluid from the extinguishing fluid reservoir and may store sufficient propellant gas for this purpose. A second propellant gas reservoir may be identical thereto. However, a second propellant gas reservoir may be smaller in size, and store less propellant gas. The second propellant gas reservoir can be used to effect the described redundant triggering via the pneumatic coupling. The second propellant gas reservoir can be, for example, a pyrotechnic gas generator. Upon triggering, an ignition charge is ignited and the explosion gas is used as propellant gas. In particular, the explosion gas is used to activate the valve of the other propellant gas reservoir via the pneumatic coupling.

It is also proposed that a first propellant gas reservoir has a valve for pneumatically coupling the first propellant gas reservoir to the first extinguishing fluid reservoir, a second propellant gas reservoir has an activation circuit, and that the valve of the first propellant gas reservoir can be pneumatically activated via an outlet of the second propellant gas reservoir. The second propellant gas reservoir can be activated via the activation circuit, which is used as a substitute for the valve of the second propellant gas reservoir. When the second propellant gas reservoir, whose outlet is pneumatically coupled to the valve of the first propellant gas reservoir, is activated, the expelled propellant gas can open the valve of the first propellant gas reservoir. The outlet of the second propellant gas reservoir may also be coupled to the input of the extinguishing fluid reservoir. This applies to both sub-systems and/or both feed platforms. The control circuits then control the activation circuit instead of the second valve. The control circuits then control one activation circuit and one valve in each of the sub-systems. The crossover circuit may be at the activation circuit or the valve. Also, the crossover circuit can take place at an activation circuit on the one hand and at the valve on the other hand.

For monitoring the functionality of the respective subsystem, it is proposed that the propellant gas reservoirs and/or valves of the first subsystem each comprise a pressure monitor for monitoring the pressure at the respective propellant gas reservoir and/or valve, and that the propellant gas reservoirs and/or valves of the second subsystem each comprise a pressure monitor for monitoring the pressure at the respective propellant gas reservoir and/or valve.

A pressure monitor may be, for example, a pressure gauge with a pressure switch. When the applied pressure is above a limit value, the pressure switch may be closed, and when the applied pressure is below a limit value, the pressure switch may be opened. This means that a closed pressure switch only opens when the pressure drop is above a limit value, i.e. is so great that the lower limit value of the pressure is reached. The pressure switch remains closed when the pressure drop is below a limit value, that is, the applied pressure remains above the lower limit value.

An ohmic resistor can be provided on the pressure switch so that the switching state of the pressure switch can be measured via a resistance measurement. If the pressure switch is closed, this can be measured via the current across the resistor. If the pressure switch is opened, this can be measured by the lack of current flow.

According to an embodiment, it is proposed that the pressure monitor respectively monitors the pressure of the propellant gas reservoir associated with the respective valve. In particular, the pressure monitor is arranged at the pneumatic input of a respective valve.

As already explained, the control circuit can be used to monitor the pressure measured at a pressure monitor, in particular via a pressure switch. If the pressure is sufficiently high, the switch is closed. If the pressure drops, the switch is opened. Both switching states of the pressure switch can be monitored via the control circuit. Thus, the state of the respective subsystems or the respective propellant gas reservoirs of the subsystems can be measured by the control circuits.

The first control circuit not only controls the first valve of the first subsystem and the second valve or the activation circuit of the second subsystem, but according to one embodiment also monitors the propellant gas reservoirs connected to these valves via the corresponding pressure monitors. According to an embodiment, the first control circuit is connected to the pressure monitor of the first propellant gas reservoir of the first subsystem and is connected to a pressure monitor of the second propellant gas reservoir of the second subsystem. According to an embodiment, the second control circuit is connected to the pressure monitor of the second propellant gas reservoir of the first subsystem and to a pressure monitor of the first propellant gas reservoir of the second subsystem. Thus, redundant monitoring of the subsystems also takes place.

In the activation state, one of the two subsystems is preferably activated, as described before. The first control circuit activates a propellant gas reservoir of a first subsystem and the second control circuit activates a propellant gas reservoir of the first subsystem, or the first control circuit activates a propellant gas reservoir of a second subsystem and the second control circuit activates a propellant gas reservoir of the second subsystem. If one of the two subsystems is activated, it must be ensured that it also triggers safely. An fault signal can be output, for example, if no sufficient pressure drop is measured at the pneumatic input of a valve in the activation state. In particular, an fault signal is output if a sufficiently high pressure drop is not measured at both pneumatic inputs of both valves of a subsystem. A high pressure drop is accompanied by a low pressure. This low pressure is detected by the pressure switch and the pressure switch opens. However, if the pressure drop is too low, the pressure switch remains closed. This can trigger an fault signal. In particular, if a control circuit expects the pressure switch to open, but it does not open due to the low pressure drop, a corresponding fault signal can be output.

In contrast, in idle state the pressure at the pneumatic input of a valve must be almost constant, but always above a minimum pressure. If a pressure drop is too great, this can lead to an fault signal. Here, too, an fault signal can already be output if the pressure drop is too large at one valve of a subsystem or even if a correspondingly high pressure drop has been detected at both valves of the subsystem.

According to one embodiment, it is proposed that the first control circuit is in operative connection with a first one of the pressure monitors of the first subsystem and a second one of the pressure monitors of the second subsystem, and that the second control circuit is in operative connection with a second one of the pressure monitors of the first subsystem and a first one of the pressure monitors of the second subsystem.

As previously explained, a valve is, for example, a solenoid valve. Also already explained was that the valves are pneumatically as well as electrically activatable control valves. Pneumatic activation can be achieved via a pneumatic actuating input, in particular by cross-connection with a pneumatic outlet of a respective other valve of the subsystem.

The control circuits are preferably electrically coupled to the respective valves. Here, too, as already explained, cross-coupling takes place so that a first control circuit is coupled to a respective valve of a respective one of the subsystems and a second control circuit is coupled to the respective other valve of the subsystems. Thus, both control circuits can activate the valves of both subsystems directly via the electrical activation and indirectly via the pneumatic cross-connection of the valves within a subsystem.

According to an embodiment, it is proposed that the pneumatic coupling of the valves to a respective outlet of the other valve is such that an activation of one of the valves causes a pneumatic activation of the other valve via the propellant gas of the propellant gas reservoir associated with the valve activated at first.

According to one embodiment, it is proposed that the control circuits are in communication with each other via a communication bus, in particular in serial communication. Thus, both control circuits can be selectively controlled via a communication bus. In order to be able to provide redundancy when controlling the control circuits, it is proposed that the control circuits are in communication with each other via at least two parallel communication buses, in particular in serial communication. This means that in the event of failure of one communication bus, the control circuits can continue to be controlled via a second communication bus. The communication bus can be formed as a closed ring, whereby in the event of a failure of a section between two control circuits, the two control circuits can still be controlled via both communication buses.

According to one embodiment, it is proposed that a thermostat is arranged at each of the first and second extinguishing fluid reservoirs. The thermostat can be used to determine whether, for example, the extinguishing fluid has frozen. The thermostats can be monitored by the respective control circuits.

To prevent extinguishing fluid from freezing, it is also proposed that a heater is arranged at each of the first and second extinguishing fluid reservoirs. The thermostat and/or heater are operatively connected to the respective control circuitry. It is proposed that the thermostat and/or heater of the first subsystem are operatively connected to the first control circuit, and that the thermostat and/or heater of the second subsystem are operatively connected to the second control circuit For example, if the thermostat determines that extinguishing fluid has frozen, an fault signal may be output. In this case, it may be useful to activate the subsystem at which no fault signal was output.

The control circuits are each set up with a line monitor and connected to the valves to monitor an electrical connection. The valves are controlled crosswise, as explained before. To ensure that this cross connection is functional, the first control circuit is connected to a line monitor of an electrical connection to a first valve of a first subsystem and to a line monitor of an electrical connection to a second valve of the second subsystem. Thus, the first control circuit can monitor one valve or the electrical connection with a valve of both subsystems, respectively. In particular, the monitoring takes place of that line which is switched to activate the valve by the respective control circuit.

The second control circuit is preferably connected to a line monitor of an electrical connection to a second valve of a first subsystem and to a line monitor of an electrical connection to a first valve of the second subsystem. Thus, the second control circuit can monitor one valve or the electrical connection with a valve of both subsystems, respectively. In particular, the line that is switched to activate the valve by the respective control circuit is monitored.

In a rail vehicle, the subsystems can be spatially separated from one another. The respective subsystems can be mounted on a support frame with and/or without control circuitry. The subsystems may be installed in a wagon (carriage) at different ends of the wagon (carriage) or in wagons (carriages) of a rail vehicle that are different from one another, in particular at the beginning and end of a rail vehicle. The communication buses can connect the control circuits to each other and to a fire alarm control center.

For increased redundancy, it is proposed that the fire fighting system include at least two feed platforms. The feed platforms may each have two subsystems on a support frame or in a housing. The feed platforms may be installed in a wagon (carriage) at different ends of the wagon (carriage) or in wagons (carriages) of a rail vehicle that are different from each other, in particular at the beginning and at the end of a rail vehicle. The communication buses can connect the control circuits of the feed platforms to each other and to a fire alarm control center.

The two feed platforms are interconnected in such a way that, in an activation state, the first subsystem of a first feed platform can be activated together with the second subsystem of a second feed platform. Furthermore, the feed-in platforms can be interconnected in such a way that, in the event of activation, the second subsystem of a first feed-in platform can be activated together with the first subsystem of a second feed-in platform. Thus, optional activation of one of two subsystems of each feed-in platform is possible. This means that if a fault signal is detected in a subsystem, a combination of two subsystems can be activated in an activation state, and the respective other combination of two subsystems can be activated. It is proposed that, in the event of a detected fault signal in an activation state in the first subsystem of the first feed platform or in the second subsystem of the second feed platform, the second subsystem of the first feed platform can be activated together with the first subsystem of the second feed platform. Also, it is proposed that when a fault signal is detected in an activation state in the second subsystem of the first feed platform or in the first subsystem of the second feed platform, the first subsystem of the first feed platform is activatable together with the second subsystem of the second feed platform.

In another aspect, there is provided a rail vehicle having a fire fighting system as described. In this rail vehicle, a feed platform is preferably arranged in a first wagon (carriage) and another feed platform is arranged in a second wagon (carriage). The wagons (carriages) are preferably arranged at distal ends of the rail vehicle.

A first feed platform may include a first subsystem and a second subsystem, and a second feed platform may include a third subsystem and a fourth subsystem. When activated, either the first and third subsystems or the second and fourth subsystems are activated via respective control circuits. In the event of a fault in the first and/or third subsystem, the second and fourth subsystems are activated. In the event of a fault in the second and/or fourth subsystem, the first and third subsystems are activated. Thus, redundant fire suppression is provided.

BRIEF DESCRIPTION OF THE DRAWINGS

In the following, the subject matter is explained in more detail with reference to drawings showing embodiments. The drawings show.

DETAILED DESCRIPTION OF SPECIFIC EMBODIMENTS

Figure 1A:
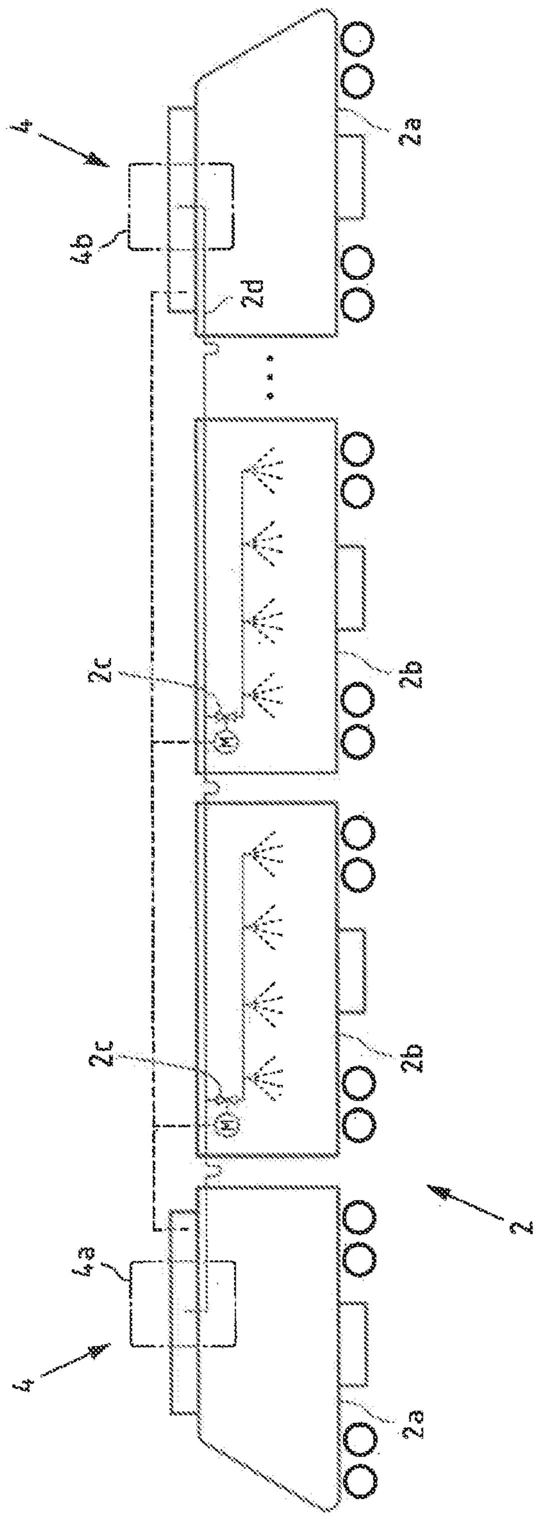
FIG. 1*a* a rail vehicle with two subsystems according to an embodiment.

FIG. 1*a* shows a rail vehicle 2 with two railcars 2*a* as well as wagons 2*b* arranged in between. Within the railcars 2*b*, there are one or more areas connected to a main pipeline 2*d* via a respective area valve 2*c*. In each area, one or more extinguishing nozzles 2*e* are connected to the piping system. The main piping 2*d* runs between two subsystems 4 and is connected to a respective extinguishing fluid reservoir of a subsystem 4. That is, the pipeline 2*d* short-circuits the two subsystems 4 with respect to their extinguishing fluid reservoirs. The subsystems 4 are arranged in separate railcars 2*a* in the example shown, but may also be otherwise distributed in the rail vehicle 2. The two subsystems 4 can also be accommodated in a railcar 2*b* or even on a common carrier frame (not shown).

Figure 1B:
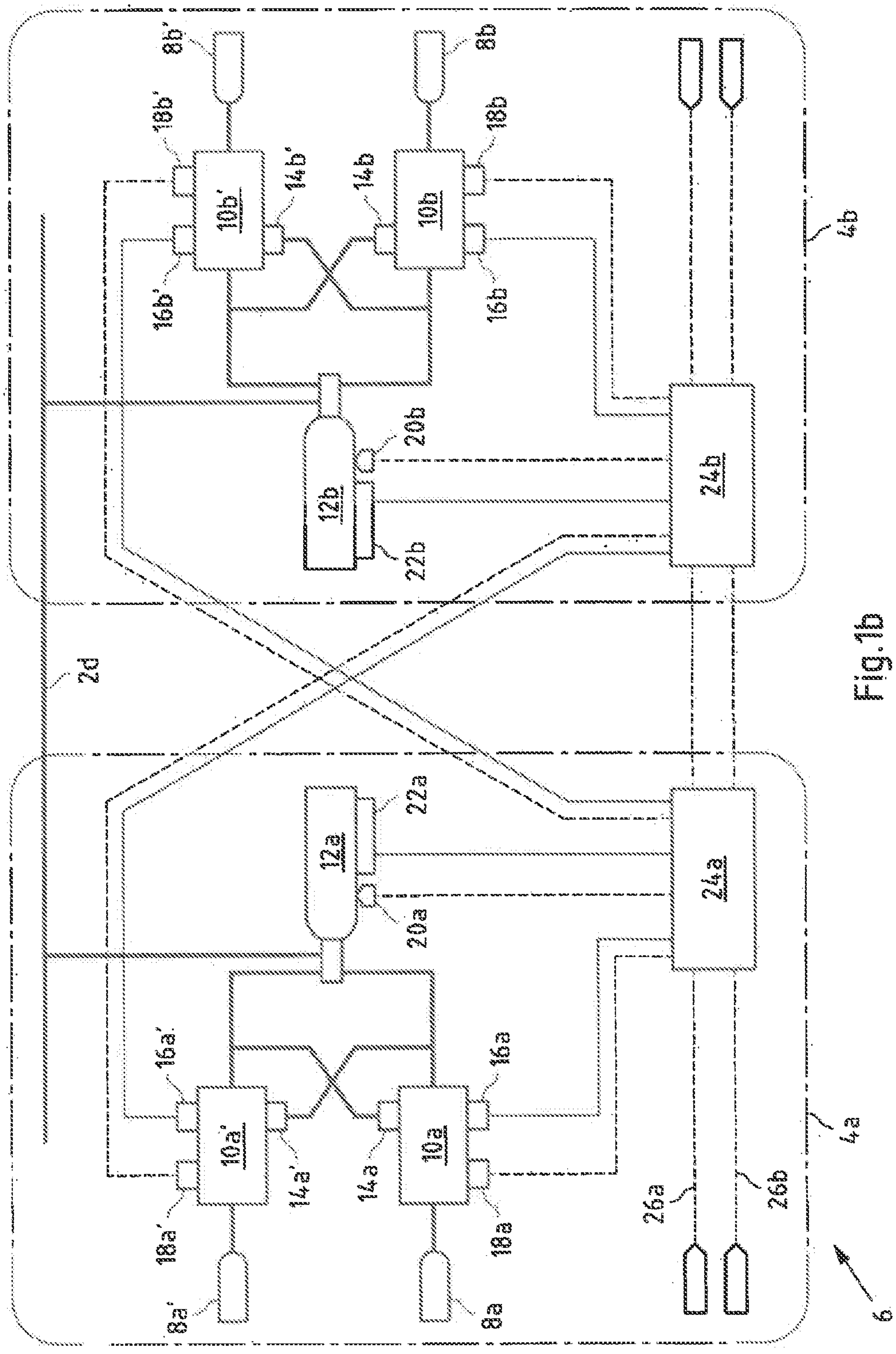
FIG. 1*b* a feed platform with two subsystems according to an embodiment.

FIG. 1*b* shows two subsystems 4*a*, 4*b* that are connected together to form a common feed platform 6 and can be constructed in an arrangement as shown in FIG. 1*a*. The subsystems 4*a, b* each have two propellant gas reservoirs 8*a*, 8*a*', 8*b*, 8*b*'. The propellant gas reservoirs 8 are each connected to an extinguishing fluid reservoir 12*a*, 12*b* via a valve 10*a*, 10*a*', 10*b*, 10*b*'. A pneumatic input of a valve 10 is connected to a propellant gas reservoir 8. A pneumatic outlet of a valve 10 is connected to an extinguishing fluid reservoir 12. The valves 10 have a control input 14*a*, 14*a*', 14*b*. 14*b*'. A respective control input 14 of a first valve 10*a*, 10*b* is connected to a pneumatic outlet of a respective second valve 10*a*', 10*b*' of the subsystem 4*a, b*. Furthermore, each valve 10 has a magnetic actuator 16*a*, 16*a*', 16*b*, 16*b*'. Furthermore, a pressure monitor 18*a*, 18*a*', 18*b*, 18*b*' is arranged at each valve 10. An outlet of an extinguishing agent reservoir 12*a*. 12*b* is connected to the pipeline 2*d*.

Thermostats 20*a*, 20*b* and heaters 22, 22*b* are provided at the extinguishing agent tanks 12*a*, 12*b*.

The feed platform 6 has two control devices 24*a*, 24*b*. The control devices 24 are connected via two parallel serial communication buses 26*a*, 26*b*. The communication buses 26*a*, 26*b* are redundant to each other.

The first control circuit 24*a* is operatively connected to the first valve 10*a* of the first subsystem 4*a* and the second valve 10*b*' of the second subsystem 4*b*. The second control circuit 24*b* is operatively connected to the first valve 10*b* of the second subsystem 4*b* and the second valve 10*a*' of the first subsystem 4*a*.

The first control circuit 24*a* is operatively connected to the first pressure switch 18*a* of the first subsystem 4*a* and the second pressure switch 18*b*' of the second subsystem 4*b*. The second control circuit 24*b* is operatively connected to the first pressure monitor 18*b* of the second subsystem 4*b* and the second pressure monitor 18*a*' of the first subsystem 4*a*.

The first control circuit 24*a* is operatively connected to the heater 22*a* of the first subsystem 4*a*, and the second control circuit 24*b* is operatively connected to the heater 22*b* of the second subsystem 4*b*.

The first control circuit 24*a* is operatively connected to the thermostat 20*a* of the first subsystem 4*a* and the second control circuit 24*b* is operatively connected to the thermostat 24*b* of the second subsystem 4*b*.

In the idle state, i.e. when there is no activation, a respective control circuit 24 monitors the respective pressure monitor 18, the thermostat 20 and the heater 22. If the thermostat 20 indicates that the extinguishing fluid in the extinguishing fluid container 12 is frozen, a corresponding fault signal is output. If the pressure monitor 18 indicates that a respective valve 10 is open or that there is no longer sufficient pressure in a respective propellant gas container 8, an fault signal is output. If a heater 22 fails, a respective fault signal is output. Thus, the control circuits 24 can be used to monitor which of the two subsystems is ready for activation.

In the event of activation, the first or the second subsystem 4*a, b* is activated via control signals on both communication buses 26*a*, 26*b*, depending on the presence of an fault signal, if applicable. When the first subsystem 4*a* is activated, the actuator 16*a* is activated by the first control circuit 24*a* and the second actuator 16*a*' is activated by the second control circuit 24*b*. Thereupon, propellant gas flows from propellant gas containers 8*a*, 8*a*' through valve 10*a*, 10*a*' and expels extinguishing fluid from extinguishing fluid container 12*a* into pipeline 2*d*.

In the event of a failure of an actuator 16*a*, 16*a*', pneumatic activation of the respective valve 10*a*, 10*a*' occurs via the pneumatic cross-circuit via the respective pneumatic actuating input 14*a*, 14*a*'. This ensures that the first subsystem triggers reliably.

In activation state of the second subsystem, a corresponding control signal is output via both communication buses 26*a*, 26*b*. The first control circuit 24*a* activates the second valve 10*b*' of the second subsystem 4*b* and the second control circuit 24*b* activates the first valve 10*b* of the second subsystem 4*b* by activating the respective actuators 16*b*, 16*b*'. The mode of operation is identical to that of the first subsystem 4*a*.

After activation, a respective pressure monitor 18 monitors whether a pressure drops as the propellant gas flows out of the propellant gas reservoir 8 and into the extinguishing agent container 12 or the pipeline 2*d*. Only if the pressure drops can it be concluded that a corresponding triggering of the valve 10 has occurred. Otherwise, an fault signal can be output and, if necessary, the subsystem, 4*a*, 4*b*, that has not yet been activated can be additionally activated.

Figure 2A:
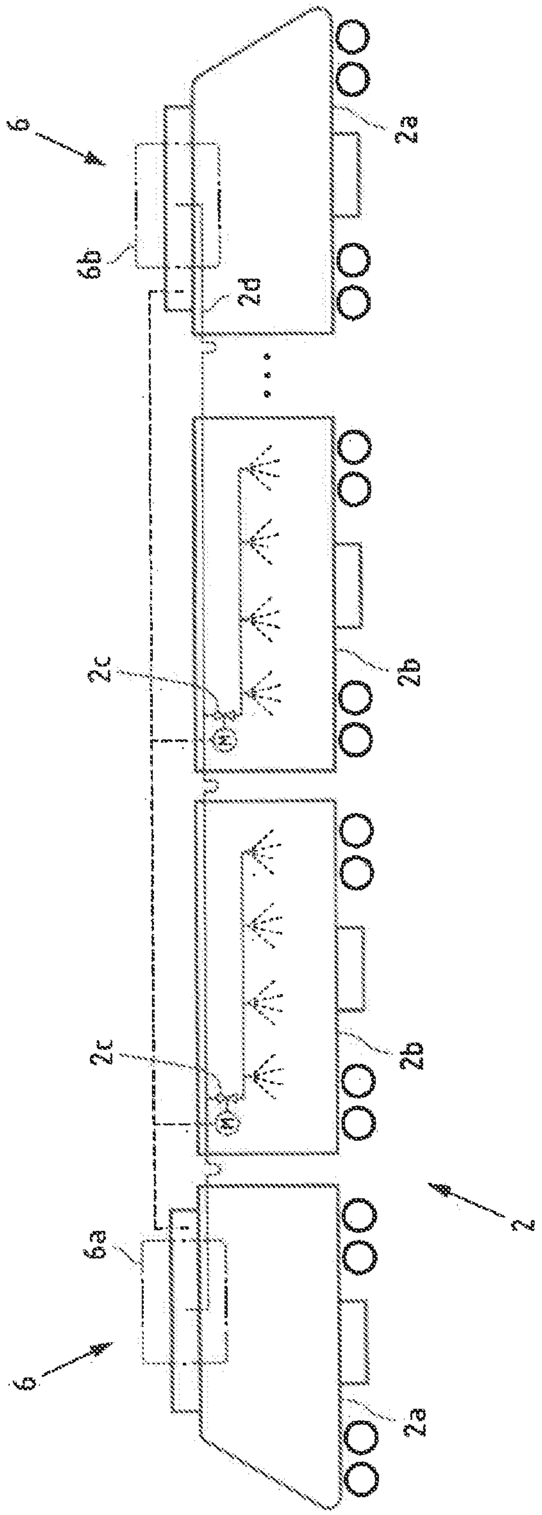
FIG. 2*a* a rail vehicle with two feed platforms according to an embodiment.

FIG. 2a shows a rail vehicle 2 corresponding to FIG. 1a, with the difference that instead of the subsystems 4a, 4b, a feed platform 6 is provided in each case. The respective feed platforms 6 can be arranged as described for FIG. 1a. The main pipeline 2d short-circuits the two feed platforms 6 with each other.

Figure 2B:
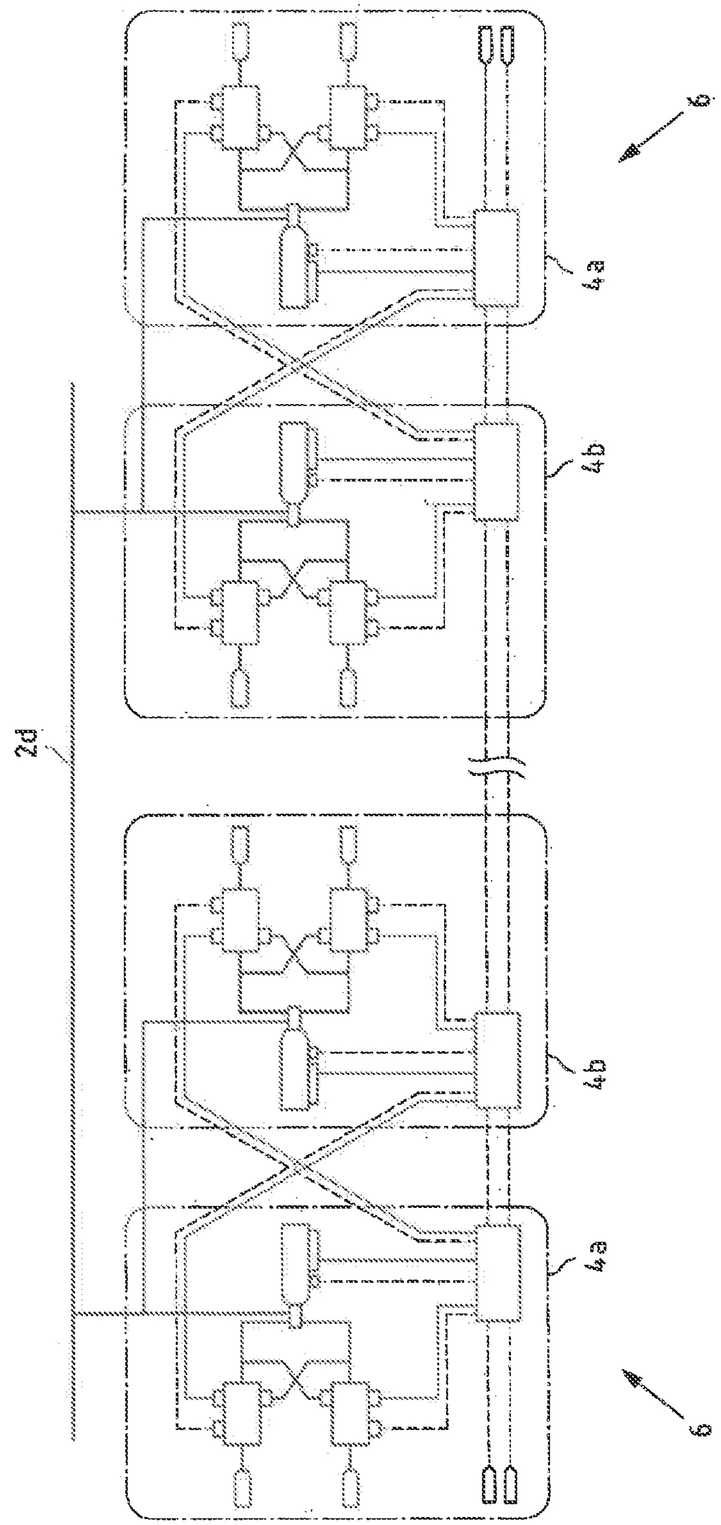
FIG. 2*b* two feed platforms with two subsystems each according to an embodiment.

FIG. 2b shows the two feed platforms 6, each of which is designed in accordance with a feed platform 6 as shown in FIG. 1b.

In activation state, the fire fighting system is controlled in such a way that either a first subsystem 4a of a first feed platform 6 and a second subsystem 4b of a second feed platform 6 are activated or a second subsystem 4b of the first feed platform 6 and simultaneously the first subsystem 4a of the second feed platform 6 are activated.

Depending on an fault signal, it is selected which combination of subsystems is activated. If an error occurs after activation, for example detected by the pressure monitor, an additional activation of the pair of subsystems not yet activated can take place.

LIST OF REFERENCE SIGNS

2 Rail vehicle
2a Railcar
2b Wagon
2c Area valve
2d Main pipeline
2e Extinguishing nozzles, especially extinguishing mist nozzles
4 Subsystem
8 Propellant gas reservoir
10 Valve
12 Extinguishing fluid reservoir
14 Pneumatic actuator input
16 Actuator, especially magnetic actuator
18 Pressure switch
20 Thermostat
22 Heater
24 Control device
26 Communication bus

What is claimed is:

1. Fire fighting system comprising:
a first feed platform arranged for feeding an extinguishing fluid to a piping system having extinguishing nozzles, including:
a first sub-system with
a first extinguishing fluid reservoir,
at least two first propellant gas reservoirs, and
a first control circuit,
wherein one first propellant gas reservoir of the at least two first propellant gas reservoirs being pneumatically coupled to a valve of the first extinguishing fluid reservoir and the one first propellant gas reservoir of the at least two first propellant gas reservoirs can be pneumatically activated via an outlet of a second propellant gas reservoir of the at least two first propellant gas reservoirs;
a second sub-system with
a second extinguishing fluid reservoir,
at least two second propellant gas reservoirs, and
a second control circuit,
wherein one second propellant gas reservoir of the at least two second propellant gas reservoirs is pneumatically coupled to a valve of the second extinguishing fluid reservoir and the one second propellant gas reservoir of the at least two second propellant gas reservoirs can be pneumatically activated via an outlet of a first propellant gas reservoir of the at least two second propellant gas reservoirs;
wherein
the first control circuit is operatively connected to the one first propellant gas reservoir of the at least two first propellant gas reservoirs of the first sub-system and to the one second propellant gas reservoir of the at least two second propellant gas reservoirs of the second sub-system, and
the second control circuit is operatively connected to the second propellant gas reservoir of the at least two first propellant gas reservoirs of the first sub-system and the first propellant gas reservoir of the at least two second propellant gas reservoirs of the second sub-system.

2. Fire fighting system of claim 1,
wherein
the outlet of at least one of the propellant gas reservoirs of the first sub-system comprises a pressure monitor for monitoring the pressure at the propellant gas reservoir,
the outlet of at least one of the propellant gas reservoirs of the second sub-system comprises a pressure monitor for monitoring the pressure at the propellant gas reservoir.

3. Fire fighting system of claim 2,
wherein
the respective control circuit monitors the pressure slope of a respective pressure monitor.

4. Fire fighting system of claim 2,
wherein
the control circuit monitors a pressure drop at the respective pressure monitor in the activation state and outputs a fault signal in the event of a pressure drop below a limit value.

5. Fire fighting system of claim 2,
wherein
the control circuit monitors a pressure drop at the respective pressure monitor in the rest state and outputs a fault signal in the event of a pressure drop above a limit value.

6. Fire fighting system of claim 2,
wherein
the first control circuit is operatively connected to a first of the pressure monitors of the first sub-system and to a second of the pressure monitors of the second sub-system, and
the second control circuit is operatively connected to a second one of the pressure monitors of the first sub-system and a first one of the pressure monitors of the second sub-system.

7. Fire fighting system of claim 1,
wherein
the valves are pneumatically and electrically activatable control valves and that the control circuits are electrically coupled to the respective valves.

8. Fire fighting system of claim 1,
wherein
an activation circuit is arranged at the outlet of at least one of the propellant gas reservoirs of at least one of the sub-systems.

9. Fire fighting system of claim 1,
wherein
that the activation circuit is electrically controllable, in particular as pyrotechnic drive, and that the control circuits are electrically coupled to the respective activation circuit.

10. Fire fighting system of claim 1, wherein the pneumatic coupling of the propellant gas reservoirs to a respective outlet of the respective other propellant gas reservoir is such that an activation of one of the propellant gas reservoirs causes a pneumatic activation of the respective other propellant gas reservoir via the propellant gas of the propellant gas reservoir activated first.

11. Fire fighting system of claim 1, wherein the control circuits are in communication connection with each other via a communication bus, in particular in serial communication connection, preferably control circuits are in communication connection with each other via at least two parallel communication buses, in particular in serial communication connection.

12. Fire fighting system of claim 1, wherein a thermostat and/or a heater is arranged on each of the first and second extinguishing fluid reservoirs, and in that the thermostat and/or the heater is operatively connected to the respective control circuit.

13. Fire fighting system of claim 12, wherein the control circuits output a fault signal depending on a signal from the thermostat and/or the heater.

14. Fire fighting system of claim 1, wherein the control circuits each have a line monitor set up for monitoring an electrical connection to the valves which are operatively connected to the respective control circuit.

15. Fire fighting system of claim 1, wherein at least a first and a second feed platforms are provided.

16. Fire fighting system of claim 1, wherein the feed platforms are interconnected in such a way that, in an activation state, the first sub-system of a first feed platform can be activated together with the second sub-system of a second feed platform, and, in the event of a detected fault signal in an activation state, the second sub-system of the first feed platform can be activated together with the first sub-system of the second feed platform.

17. Fire fighting system of claim 1, wherein a respective extinguishing fluid reservoir is in fluid communication with the piping system, in particular is connected to a main line.

18. Fire fighting system of claim 1, wherein a check valve is arranged between at least one respective extinguishing fluid reservoir and the piping system.

19. Rail vehicle with a fire fighting system of claim 1.

20. Rail vehicle of claim 19 comprising at least two carriages, wherein a first feed platform is arranged in a first of the carriages and a second feed platform is arranged in a second of the carriages.

21. A method of operating a fire fighting system of claim 15 in which in an activation event, a respective first sub-system of the first feed platform is activated together with a second sub-system of the second feed platform, and in a fault signal, a second sub-system of the first feed platform is activated together with a first sub-system of the second feed platform.

22. Method of claim 21, wherein it is monitored from which control circuit of a subsystem an fault signal is output and in that the activation of the subsystems takes place as a function thereof.

* * * * *